Oct. 15, 1929.  H. J. MURPHY  1,731,787
LUBRICATING APPARATUS
Filed July 22, 1925
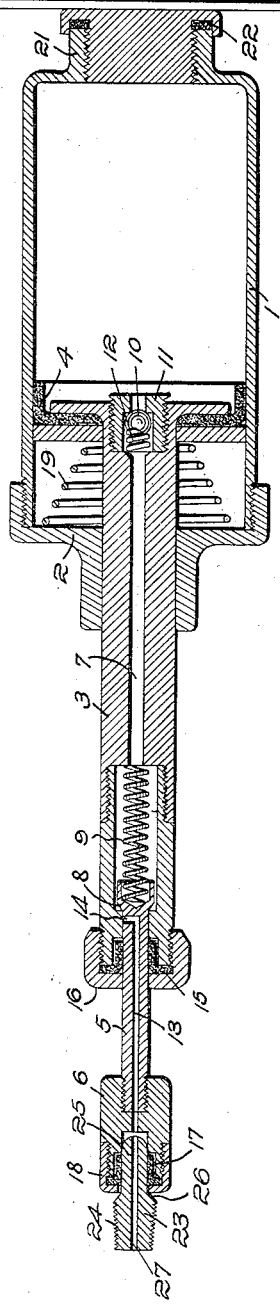
Inventor:
Howard J. Murphy.

Patented Oct. 15, 1929

1,731,787

UNITED STATES PATENT OFFICE

HOWARD J. MURPHY, OF READING, MASSACHUSETTS, ASSIGNOR, BY MESNE ASSIGN-MENTS, TO ALEMITE CORPORATION, OF CHICAGO, ILLINOIS, A CORPORATION OF DELAWARE

LUBRICATING APPARATUS

Application filed July 22, 1925. Serial No. 45,298.

This invention aims to provide an improved lubricant-expelling device.

In the drawings, which illustrate preferred embodiments of my invention:—

Figure 1 includes a longitudinal section of a lubricant-expelling gun engaging a nipple and being partly in elevation;

Fig. 2 is a longitudinal section of the discharge end of the gun showing the relation of the parts thereof when lubricant is being discharged therefrom at a relatively high potential pressure;

Fig. 3 is a front elevation of the lubricant-expelling device;

Fig. 4 is a section on the line 4—4 of Fig. 2;

Fig. 5 is an enlarged section of the nozzle part of the lubricant-expelling device engaged with a modified form of lubricant-receiving nipple; and Fig. 6 is a section on the line 6—6 of Fig. 5.

Referring to the drawings, I have shown a lubricant-expelling device which is simple, compact and inexpensive in construction. It includes means for expelling lubricant under an initially high pressure and then, if desirable, a continued low pressure, all of which may be accomplished by very simple operations. With the device illustrated, lubricant may be expelled to a lubricant-receiving nipple under high then low pressure without the use of the usual coupling means formed on the nipple and in the nozzle of the device, as provided in other known devices for similar use. Further, the seal between the nipple and the device is formed by the use of a hat-shaped sealing washer rather than by engagement of the end of the nipple with a flat or rounded washer as provided in other devices for similar use.

The drawings illustrate a lubricant-expelling gun including a supply barrel 1 having a front head 2 providing a guide for a slidably operated piston stem 3 carrying, interiorly of the barrel, a piston 4. The piston stem carries a displacing plunger 5 at its outer end which in turn carries a nozzle part 6 for engagement with a lubricant-receiving nipple.

The piston stem 3 is cored to provide a chamber 7 of relatively smaller cross-sectional area than the barrel. At each end of the chamber, I have provided means for entrapping the lubricant therein. At the discharge end of the chamber, I have provided an inwardly opening closure valve 8, formed integral with the displacing plunger 5 and held against its seat by a spring 9. At the rear end of the chamber, I have provided a ball check 10 held seated against a seat part 11 by a spring 12 (Figs. 1 and 2) thereby to permit passage of lubricant into the chamber 7 but preventing lubricant from flowing from the chamber to the barrel 1.

The displacing plunger 5 is cored to provide a central passage 13 communicating with a short passage 14 in front of the valve 8 so that lubricant may flow from the chamber 7 through the passages 14 and 13 when the valve is unseated. The displacing plunger 5 is surrounded by a hat-shaped sealing washer 15 held in position against the end of the piston stem 4 by a removable cap 16. This sealing washer 15 prevents leakage of lubricant past the periphery of the displacing plunger.

The nozzle part 6 is threadedly secured to the end of the displacing plunger 5 and carries a hat-shaped sealing washer 17 held in place between a removable cap 18 and a shoulder at the outer end of the nozzle part thereby to provide a lubricant-pressed seal to prevent leakage of lubricant past a lubricant-receiving nipple as hereinafter described.

The piston 4 may be urged toward the rear of the barrel 1 by a relatively stiff spring 19 interposed between the front head 2 and the piston 4, thereby to compress the lubricant sufficiently to feed lubricant to the chamber whenever there is space therein.

A handle 20 is threaded into a reduced portion 21 at the rear end of the barrel 1 and a tight seal is provided between the parts by a suitable packing 22. The barrel 1 may be filled with lubricant by simply removing the handle 20, grasping the barrel 1 in one hand and pulling the piston 4 toward the front end of the gun and holding it there with the other while the barrel is refilled through the opening at the rear end of the barrel and until the handle has been replaced. The device is then ready for use in connection with lubricating bearings having lubricant-receiving nipples 23 attached thereto.

The nipple 23 illustrated in Figs. 1 and 2 is provided with a threaded portion 24 for engagement with a bearing and a smooth end portion 25 for engagement with the nozzle 6 without the usual interengaging coupling means provided in connection with other known devices for similar use.

Engagement of the gun with a nipple 23 may be effected by introducing the nozzle 6 over the smooth end portion 25 of the nipple and sliding the nozzle relative to the smooth end until the cap 18 abuts against a shoulder 26 between the threaded portion 24 and smooth end portion 25 of the nipple. Thus the smooth end of the nipple is surrounded by the sealing washer 17 and the lubricant passage 27 in the nipple communicates with the lubricant-conveying passages of the gun at the discharge end thereof.

A push on the handle 20 in the direction of the nipple when the gun is engaged therewith, urges the barrel 1 and the piston stem 3 toward the nipple as a unit. The nozzle 6 and displacing plunger 5 remain stationary during the operation so that the seat for the closure valve 8 may be moved away from the valve. The lubricant will thereby be displaced from the chamber 7 and forced through the passages in the plunger 5 to the lubricant-receiving nipple under a relatively high potential pressure.

If a bearing requires more lubricant than it receives under high pressure from the chamber 7, a continued push on the handle 20 will, after the cap 16 abuts against the nozzle part 6, urge the barrel forward relative to the remainder of the device. Thus a quantity of lubricant may be forced from the barrel past the ball check 10, through the chamber 7 to the nipple 23 under a relatively lower potential pressure than when the lubricant is expelled solely from the chamber 7.

Lubricant may be expelled entirely under high pressure by reciprocating the barrel 1 and piston stem 3 as a unit relative to the displacing plunger 5.

During expulsion of lubricant to the nipple 23, the sealing washer 17 is pressed tightly against a portion of the smooth end 25 of the nipple by the lubricant back of that portion of the washer which engages the nipple. Also the lubricant presses the hat-shaped washer 15 against the displacing plunger 5, thereby providing a lubricant-tight seal to prevent leakage.

The cross-sectional area of the displacing plunger 5 is greater than that of the smooth end of the nipple 23, thereby to prevent the resultant back pressure from disconnecting the nozzle from the nipple. The pressure on the sealing washer 15 aids largely in maintaining engagement between the nozzle and the nipple when lubricant is being expelled at a relatively high potential pressure because the pressure is transverse rather than longitudinal as in other known devices where no coupling means are used. This washer thereby provides a more effective seal between the parts than does an end seal method.

Referring to Figs. 5 and 6, I have illustrated a slightly modified form of nipple. In this instance, the smooth end portion of the nipple is provided with a neck or annular groove 28, into which the sealing washer is pressed to form the seal between the nipple and the gun.

While I have shown and described a preferred embodiment of my invention, it will be understood that changes involving omission, substitution, alteration and reversal of parts and even changes in the mode of operation may be made without departing from the scope of my invention, which is best defined in the appending claims.

I claim:—

1. A lubricant-expelling device comprising, in combination, a supply barrel, a chamber of relatively smaller cross-sectional area than said barrel generally aligned therewith, a check valve between said barrel and said chamber for trapping lubricant in said chamber, a nozzle beyond said chamber and means for forcing the lubricant from said device under an initially high pressure and thereafter under a lower pressure, said means being actuated by pushing said barrel towards said nozzle when the latter is engaged with a nipple.

2. Lubricating apparatus comprising, in combination, a barrel, a chamber generally aligned with said barrel and presenting a substantially smaller cross-sectional area than said barrel, a valve between said barrel and said chamber to permit passage of lubricant in one direction only, a nozzle beyond said chamber for engagement with a lubricant-receiving nipple without interengaging coupling means, means for expelling lubricant from the barrel at low pressure, and means for expelling the lubricant from said chamber under relatively high potential pressure when said barrel is pushed toward the nipple.

3. Lubricating apparatus comprising, in combination, a barrel, spring-actuated means for expelling lubricant from said barrel, a chamber generally aligned with said barrel and presenting a substantially smaller cross-sectional area than said barrel, a valve between said barrel and said chamber to permit passage of lubricant in one direction only, a nozzle beyond said chamber for engagement with a lubricant-receiving nipple without interengaging coupling means and a displacing plunger for expelling the lubricant from said chamber under relatively high potential pressure when said barrel and said chamber are pushed toward the nipple.

4. A push-operated lubricant-expelling device comprising, in combination, a lubricant supply barrel, a chamber generally aligned with said barrel and presenting a substantially smaller cross-sectional area than said barrel, a valve between said barrel and said chamber to permit passage of lubricant from said barrel to said chamber and to prevent return thereof, a spring-actuated piston slidable in said barrel to force lubricant from said barrel to said chamber, a nozzle beyond said chamber for engagement with a lubricant-receiving nipple and a displacing plunger rigidly secured to said nozzle and slidable in said chamber for expelling lubricant therefrom under relatively high potential pressure when said chamber and said barrel are urged toward the nipple, said barrel slidable relative to said chamber.

5. A push-operated lubricant-expelling device comprising, in combination, a lubricant supply barrel, a piston in said barrel for expelling lubricant therefrom, a chamber reciprocable with said piston, said chamber being of relatively small cross-sectional area and generally aligned with said barrel, a valve between the barrel and the chamber, a nozzle beyond said chamber for cooperative engagement with a lubricant-receiving nipple without interengaging coupling means and means for expelling the lubricant from said chamber to the nipple when said chamber is advanced toward the nipple.

6. A lubricant-expelling device including a supply barrel, a chamber of relatively smaller cross-sectional area than said barrel generally aligned therewith, means for automatically forcing the lubricant from said barrel to said chamber, a valve at each end of said chamber for trapping the lubricant in said chamber, a nozzle beyond said chamber for engagement with a lubricant-receiving nipple and a displacing plunger slidable in said chamber for forcing lubricant therefrom under relatively high potential pressure when said barrel and said chamber are pushed as a unit toward the nipple.

7. A lubricant-expelling device including a barrel having a front head, a chamber-presenting part slidable in said front head, a piston rigidly secured to said part for forcing lubricant from said barrel to a chamber in said part, a nozzle part beyond said chamber-presenting part for engagement with a lubricant-receiving nipple and a plunger rigidly secured to said nozzle, said chamber-presenting part slidable relative to said plunger for expelling the lubricant from the chamber to a lubricant-receiving nipple.

In testimony whereof, I have signed my name to this specification.

HOWARD J. MURPHY.